(12) United States Patent
Wijewickreme et al.

(10) Patent No.: US 11,320,260 B2
(45) Date of Patent: May 3, 2022

(54) APPARATUS AND METHOD FOR MONITORING LOSS OF SOIL COVER

(71) Applicant: THE UNIVERSITY OF BRITISH COLUMBIA, Vancouver (CA)

(72) Inventors: Kaluarachchige Dharmapriya Wijewickreme, Burnaby (CA); Michael Isaacson, Vancouver (CA); Ruslan Shanth Amarasinghe, Calgary (CA); Noboru Yonemitsu, Burnaby (CA)

(73) Assignee: The University of British Columbia, Vancouver (CA)

( * ) Notice: Subject to any disclaimer, the term of this patent is extended or adjusted under 35 U.S.C. 154(b) by 171 days.

(21) Appl. No.: 16/482,051

(22) PCT Filed: Jan. 31, 2018

(86) PCT No.: PCT/CA2018/050114
§ 371 (c)(1),
(2) Date: Jul. 30, 2019

(87) PCT Pub. No.: WO2018/141059
PCT Pub. Date: Aug. 9, 2018

(65) Prior Publication Data
US 2020/0064129 A1 Feb. 27, 2020

Related U.S. Application Data

(60) Provisional application No. 62/455,323, filed on Feb. 6, 2017.

(51) Int. Cl.
*G01B 21/08* (2006.01)
*G01F 1/10* (2006.01)
(Continued)

(52) U.S. Cl.
CPC ............... *G01B 21/08* (2013.01); *G01F 1/10* (2013.01); *G01J 1/4204* (2013.01); *G01L 5/00* (2013.01);
(Continued)

(58) Field of Classification Search
CPC ......... G01F 23/14; G01F 23/161; G01B 7/26; E02D 1/00; G01C 13/004; G01C 13/008
See application file for complete search history.

(56) References Cited

U.S. PATENT DOCUMENTS 3,617,996 A * 11/1971 Herbert ................... G01S 15/87
367/105
4,287,756 A * 9/1981 Gallagher ............... G01F 23/24
73/290 R
(Continued)

FOREIGN PATENT DOCUMENTS

CN 1417594 A 5/2003
CN 103471648 A 12/2013
(Continued)

OTHER PUBLICATIONS

International Patent Application No. PCT/CA2018/050114, International Search Report and Written Opinion dated Apr. 16, 2018.
(Continued)

*Primary Examiner* — Tran M. Tran
(74) *Attorney, Agent, or Firm* — Borden Ladner Gervais LLP; Todd Keeler

(57) ABSTRACT

A device for determining a height of soil above a structure buried below a soil bed includes a sensor assembly comprising a total stress pressure sensor for transmitting a first signal indicating a total pressure, a pore water pressure sensor located proximate to the total stress pressure sensor, the pore water pressure sensor for transmitting a second signal indicating a fluid pressure, a sensor module config-
(Continued)

ured to receive the first and the second signals, determine a difference between the first signal and the second signal, based on the difference between the first signal and the second signal, determine a height of soil above the sensor assembly, and transmit a third signal indicating the height of soil to an external device.

20 Claims, 4 Drawing Sheets

(51) Int. Cl.
  *G01J 1/42* (2006.01)
  *G01L 5/00* (2006.01)
  *G01L 19/00* (2006.01)
  *G01P 1/00* (2006.01)
  *G01P 15/00* (2006.01)

(52) U.S. Cl.
  CPC ............ *G01L 19/00* (2013.01); *G01P 1/00* (2013.01); *G01P 15/00* (2013.01)

(56) References Cited

U.S. PATENT DOCUMENTS

| | | | | |
|---|---|---|---|---|
| 4,353,171 A * | 10/1982 | Spears | G01B 5/207 | 33/521 |
| 4,855,966 A * | 8/1989 | Cinquino | E02B 17/0034 | 367/99 |
| 5,191,787 A * | 3/1993 | Hanson | G01N 33/24 | 73/86 |
| 5,243,850 A * | 9/1993 | Hanson | G01N 33/24 | 73/86 |
| 5,331,847 A * | 7/1994 | Hanson | G01N 33/24 | 73/86 |
| 5,349,327 A * | 9/1994 | Waters | E01D 19/02 | 200/61.47 |
| 5,479,724 A | 1/1996 | Nahajski et al. | | |
| 5,532,687 A * | 7/1996 | Richardson | E02B 3/00 | 324/207.22 |
| 5,753,818 A | 5/1998 | Mercado | | |
| 5,784,338 A * | 7/1998 | Yankielun | G01N 17/00 | 367/13 |
| 6,084,393 A * | 7/2000 | Yankielun | G01N 3/567 | 324/326 |
| 6,100,700 A * | 8/2000 | Yankielun | H04B 13/02 | 324/533 |
| 6,121,894 A * | 9/2000 | Yankielun | G01N 17/00 | 340/870.31 |
| 6,181,841 B1 * | 1/2001 | Hodge | G01B 11/16 | 385/12 |
| 6,260,409 B1 * | 7/2001 | Briaud | E01D 19/02 | 73/86 |
| 6,463,801 B1 * | 10/2002 | Young | E02D 1/04 | 73/170.32 |
| 6,526,189 B1 * | 2/2003 | Yankielun | G01F 23/292 | 324/534 |
| 6,541,985 B2 * | 4/2003 | Yankielun | E02B 3/00 | 324/326 |
| 6,647,161 B1 * | 11/2003 | Hodge | G01B 11/16 | 385/12 |
| 6,862,528 B2 * | 3/2005 | Scannell | G01M 5/0033 | 340/601 |
| 6,909,669 B1 | 6/2005 | Yankielun et al. | | |
| 7,005,662 B2 * | 2/2006 | Caron | A01G 25/167 | 250/559.4 |
| 7,624,630 B2 * | 12/2009 | Masuda | E02D 1/00 | 73/152.59 |
| 7,669,481 B2 * | 3/2010 | Lopreiato | E01D 19/02 | 73/778 |
| 7,810,381 B2 * | 10/2010 | Boggess | G01N 3/42 | 73/84 |
| 7,832,274 B1 * | 11/2010 | Mercado | G01N 29/043 | 73/594 |
| 7,975,532 B2 * | 7/2011 | Lee | G01N 19/06 | 73/86 |
| 8,339,452 B2 * | 12/2012 | Chang | H04N 7/185 | 348/135 |
| 8,352,213 B2 * | 1/2013 | Chang | H04N 7/185 | 702/166 |
| 8,381,582 B2 * | 2/2013 | Dahan | G01N 33/246 | 73/152.25 |
| 8,560,240 B2 * | 10/2013 | Willden | E01D 22/00 | 702/2 |
| 8,587,646 B2 * | 11/2013 | Chang | G03B 37/02 | 348/81 |
| 9,010,176 B2 * | 4/2015 | Ansari | G01C 25/00 | 73/53.01 |
| 9,322,142 B2 * | 4/2016 | Bergendahl | E02D 1/022 | |
| 9,360,380 B2 * | 6/2016 | Tonina | G01K 1/02 | |
| 9,464,888 B2 * | 10/2016 | Huang | G01B 7/004 | |
| 10,061,044 B2 * | 8/2018 | Farrington | G01V 1/001 | |
| 10,120,835 B2 * | 11/2018 | Sayed | G01N 3/00 | |
| 10,180,509 B2 * | 1/2019 | Lin | G01V 1/166 | |
| 10,254,150 B2 * | 4/2019 | Eskildsen | G08C 17/02 | |
| 10,302,471 B1 * | 5/2019 | Liu | G01C 13/002 | |
| 10,352,698 B2 * | 7/2019 | Lin | G01F 23/0023 | |
| 10,830,661 B2 * | 11/2020 | Song | G01N 21/7703 | |
| 10,844,565 B2 * | 11/2020 | Arslan | E02D 5/60 | |
| 11,125,656 B2 * | 9/2021 | Pasch | E21B 10/44 | |
| 11,150,155 B2 * | 10/2021 | Pool | G01L 9/08 | |
| 2008/0092656 A1 | 4/2008 | Lopreiato | | |
| 2009/0000361 A1 * | 1/2009 | Bloomquist | G01N 3/24 | 73/86 |
| 2011/0012728 A1 * | 1/2011 | McCane | G01S 5/0027 | 340/539.1 |
| 2012/0112738 A1 * | 5/2012 | Chen | G01R 33/022 | 324/239 |
| 2012/0303276 A1 | 11/2012 | Bower | | |
| 2013/0091939 A1 * | 4/2013 | Chen | G01N 33/24 | 73/86 |
| 2013/0233079 A1 | 9/2013 | Swartz et al. | | |
| 2014/0079248 A1 * | 3/2014 | Short | G01S 3/74 | 381/119 |
| 2015/0096368 A1 * | 4/2015 | O'Brien | G01N 9/24 | 73/32 A |
| 2015/0153152 A1 * | 6/2015 | Huang | G01V 3/08 | 324/345 |
| 2015/0369676 A1 * | 12/2015 | Kia | E21B 47/06 | 73/784 |
| 2017/0030800 A1 * | 2/2017 | McAlpin | G01M 10/00 | |
| 2017/0277815 A1 * | 9/2017 | Lorang | G01S 15/58 | |
| 2018/0136085 A1 * | 5/2018 | Lochry | G01M 5/0025 | |

FOREIGN PATENT DOCUMENTS

EP        1256801 A2    11/2002
WO    2014056541 A1    4/2014

OTHER PUBLICATIONS

Karimian, "Response of Buried Steel Pipelines Subjected to Longitudinal and Transverse Ground Movement," Doctoral Dissertation, University of British Columbia, 2006.

Prendegrast et al., "A Review of Bridge Scour Monitoring Techniques," Journal of Rock Mechanics and Geotechnical Engineering, Apr. 2014, vol. 6 (2), pp. 138-149.

* cited by examiner

APPARATUS AND METHOD FOR MONITORING LOSS OF SOIL COVER

FIELD

The present disclosure relates to an apparatus and method for determining height of soil cover, including but not limited to monitoring loss of soil cover over pipelines or other structures buried beneath waterways.

BACKGROUND

During flood events, soil that covers, for example, a pipeline that crosses under a waterway, such as a river, may be washed away due to the increase in water flow, in what may be referred to as "scour". If the extent of the scour is sufficient, the pipeline may become exposed and vulnerable to damage by collisions with, for example, debris swept down the waterway, which, in some cases, may lead to rupture of the pipeline. Scour of soil by the flow of water around other structures, such as bridge piers, can lead to disruptions to service or, in severe cases, even collapse.

Various methods have been proposed or utilized to assess the extent of scour related to soil covering a structure buried beneath a waterway. These methods include: (i) the use of single-use devices consisting of float out devices or buried tethered switches, and (ii) the use of pulse, radar, acoustic and electrical conductivity devices that are either embedded in the soil to detect the sediment-water interface or are towed along the water surface to determine the geophysical profile of a streambed.

Devices that are currently utilized to assess the extent of scour in soil are generally limited to a single use, or are complex devices that may be expensive to manufacture, or require water craft to take measurements. In certain circumstances, such as when monitoring scour in soil above a pipeline that is buried beneath a waterway during exposure to a flood event, it is beneficial to have real-time monitoring capability so that excessive scour can be detected and appropriate emergency actions can be taken in a timely manner. Such real-time monitoring capability is generally not feasible from a financial standpoint with devices that are currently utilized to assess the extent of scour in soil.

Improvements in scour detection are desirable.

BRIEF DESCRIPTION OF THE DRAWINGS

Embodiments of the present disclosure will now be described, by way of example only, with reference to the attached Figures.

DETAILED DESCRIPTION

Figure 1:
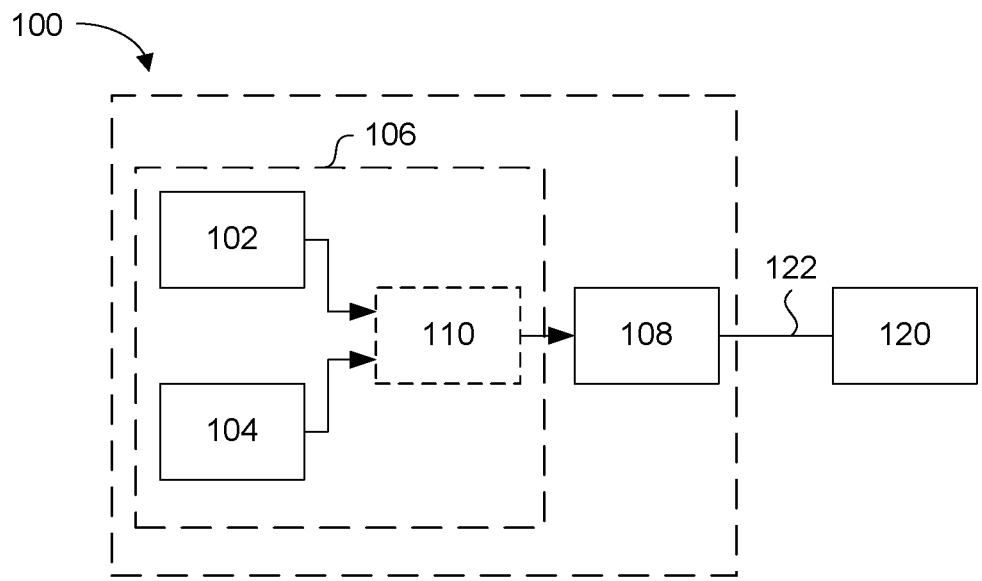
FIG. 1 is a schematic diagram of a device for monitoring the height of soil according to an embodiment.

Embodiments of the present disclosure relate to a device and method for determining a height of soil above a structure buried below a soil bed of a waterway.

In an embodiment, the present disclosure provides a device for determining a height of soil above a structure buried below a soil bed of a waterway that includes a sensor assembly including a total stress pressure sensor for transmitting a first signal indicating a total pressure on the total stress pressure sensor due to soil and water, a pore water pressure sensor located proximate to the total stress pressure sensor, the pore water pressure sensor for transmitting a second signal indicating a fluid pressure on the pore water pressure sensor due to water only, a sensor module in communication with the total stress pressure sensor and the pore water pressure sensor, the sensor module configured to receive the first and the second signals, determine a difference between the first signal and the second signal, based on the difference between the first signal and the second signal, determine a height of soil above the sensor assembly, and transmit a third signal indicating the height of soil to an external device.

In an example embodiment, the sensor assembly further includes an accelerometer coupled to a housing of the device by a tether, the accelerometer for transmitting a fourth signal indicating movement of the accelerometer, wherein the sensor module is in communication with the accelerometer and is further configured to, receive the fourth signal, based on the fourth signal, determine that the accelerometer is moving, and transmit a fifth signal indicating that the accelerometer is moving.

In an example embodiment, the sensor module determines that the accelerometer is moving by determining, based on the fourth signal, that the movement exceeds a movement threshold.

In an example embodiment, the sensor assembly further includes a light sensor, the light sensor for transmitting a sixth signal indicating a lighting level, the sensor module is in communication with the light sensor and is further configured to receive the sixth signal from the light sensor, based on the sixth signal, determine that lighting level exceeds a lighting threshold, and transmit a seventh signal indicating that the lighting level exceeds a threshold.

In an example embodiment, the sensor assembly further includes a flow sensor, the flow sensor for transmitting an eighth signal indicating a flow of fluid through the flow sensor, and the sensor module is in communication with the flow sensor and is further configured to receive the eighth signal from the flow sensor, based on the eighth signal, determine that a fluid is flowing through the flow sensor, and transmit a ninth signal indicating that fluid is flowing through the flow sensor.

In an example embodiment, the sensor module determines that fluid is flowing through the flow sensor by determining, based on the eighth signal, that the flow of fluid through the flow sensor exceeds a flow threshold.

In an example embodiment, the pore water pressure sensor includes a saturated porous stone.

In an example embodiment, the saturated porous stone is saturated by one of boiling the porous stone in water and saturating the porous stone with glycerin.

In an example embodiment, determining the height of the soil based on the difference between the first signal and the second signal includes determining the height of the soil based on a calibration factor.

In an example embodiment, the sensor assembly is housed within a waterproof housing.

In an example embodiment, the sensor module is configured to transmit signals to the external device via a wireless transmitter or via a wired connection.

In another embodiment, the present disclosure provides a method for determining a height of soil above a structure buried below a soil bed of a waterway that includes receiving a first signal from a total stress pressure sensor coupled to the structure, the first signal indicating a total pressure measured by the total stress pressure sensor due to soil and water, receiving a second signal from a pore water pressure sensor coupled to the structure proximate to the total stress pressure sensor, the second signal indicating a fluid pressure on the pore water pressure sensor due to water only, determining a difference between the first signal and the second signal, based on the difference between the first signal and the second signal, determining a height of soil above the total stress pressure sensor and the pore water pressure sensor, and transmitting a third signal indicating the determined height of soil to an external device.

In an example embodiment, the method includes receiving a fourth signal from an accelerometer coupled to the structure by a tether, the fourth signal indicating movement of the accelerometer, and based on the fourth signal, determining that the accelerometer is moving, transmitting a fifth signal indicating that the accelerometer is moving.

In an example embodiment, determining that the accelerometer is moving includes determining, based on the fourth signal, that the movement of the accelerometer exceeds a movement threshold.

In an example embodiment, the method includes receiving a sixth signal from a light sensor coupled to the structure, the sixth signal indicating a lighting level, based on the sixth signal, determining that the lighting level exceeds a lighting threshold, and transmitting a seventh signal indicating that the lighting level exceeds a threshold.

In an example embodiment, the method includes receiving an eighth signal from a flow sensor coupled to the structure, the eighth signal indicating a flow of fluid through the flow sensor, based on the eighth signal, determining that a fluid is flowing through the flow sensor, and transmitting a ninth signal indicating that fluid is flowing through the flow sensor.

In an example embodiment, determining that fluid is flowing through the flow sensor includes determining, based on the eighth signal, that the flow of fluid through the flow sensor exceeds a flow threshold.

In an example embodiment, the method includes saturating a porous stone of the pore water pressure sensor by one of boiling the porous stone in water and saturating the porous stone with glycerin prior to coupling the pore water pressure sensor to the structure.

In an example embodiment, determining the height of the soil based on the difference between the first signal and the second signal includes determining the height of the soil based on a calibration factor.

In an example embodiment, transmitting the third signal to the external device includes one of transmitting wirelessly via a wireless transmitter or transmitting via a wired connection.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

FIG. 1 shows a schematic representation of a device 100 for determining a height of soil above a structure buried below a soil bed of a waterway. The structure may be, for example, a pipeline or a pier of a bridge. The device 100 includes a total stress pressure sensor 102, a pore water pressure sensor 104, which together may be referred to as sensor assembly 106. The sensor assembly 106 may optionally include a signal processing unit 110 that processes the output signals from the pressure sensors 102, 104. A sensor module 108 is electrically coupled to the sensors 102, 104 of the sensor assembly 106 to receive signals output by the sensors 102, 104 and determine the height of the soil above the sensors 102, 104 based on the received signals.

The total stress pressure sensor 102 measures the total pressure due to the weight of the soil and water pressing down on the total stress pressure sensor 102. The total pressure measured by the total stress pressure sensor 102 is the sum of: (i) the effective stress, as usually defined in soil mechanics, arising from the soil particles above the pressure sensor 102; and (ii) the pore water pressure arising from the water above the pressure sensor 102.

The pore water pressure sensor 104 measures the pressure on the pore water pressure sensor 104 due only to the water pressure arising from the water above the pressure sensor 104. The pressure sensors 102 and 104 may each comprise any suitable pressure sensor. In an example, the sensors 102 and 104 may each comprise a pressure transducer.

The pore water pressure sensor 104 also typically includes a porous element (not shown) between the pressure transducer and the external environment. The porous element facilitates water passing through and reaching equilibrium in contact with the pressure transducer of the pore water pressure sensor 104, but inhibits the soil from passing through. The porous element is typically held in place by a body of the pressure sensor 104 and spaced away from the diaphragm of the pressure transducer in a manner that inhibits soil from entering the pressure sensor 104 and coming into contact with the diaphragm of the pressure transducer. The body of the pressure sensor 104 supports the weight of the soil pressing on the porous element in order to isolate the pressure transducer from the pressure due to the weight of the soil. In this way, the pressure measured by the pore water pressure sensor 104 is the pressure due to water only, and not the soil.

The porous element may be formed from a ceramic porous stone having a desired size such as the porous stone materials typically used in geotechnical triaxial testing of soils or equivalent. Desirably the porous stone may be fully saturated with water or glycerin prior to installing the device 100 to a structure. Saturating the porous element inhibits entrapment of air bubbles within the porous element and the volume of space between the porous element and the diaphragm of the pressure transducer. Entrapped air bubbles may skew the pore water pressure measured by the pore water pressure sensor 104. The porous stone may be saturated by boiling the porous stone in water immediately prior to installation of the device 100, or saturating the porous stone with glycerin. Glycerin has a high viscosity such that the glycerin generally remains in the porous element to maintain saturation during the installation process. The volume of space in between the porous stone and the diaphragm of pressure transducer also needs to be saturated. Saturating this volume of space may be performed by, for example, injecting de-aired water into this space using an injection syringe. However, any suitable method of saturating the pore water pressure sensor 104 may be utilized.

The total stress pressure sensor 102 and the pore water pressure sensor 104 are installed as close together as practicable such that when the total stress pressure sensor 102 measures the pressure of a column of soil and water, the pore water pressure sensor 104 effectively measures the pressure of the same column of water in order to provide as accurate a determination of the effective stress arising from the soil overburden above the sensor assembly 106 as possible.

Furthermore, the pressure sensors 102, 104 may be calibrated to facilitate determining the difference between the output signals of the two pressure sensors 102, 104 and accurately indicating the effective stress arising from the soil overburden only. For example, calibration may be performed using known static water pressure levels by flush-mounting the pressure sensors 102, 104 at the base of an upright cylinder that is filled with water in step-by-step water-level increments of, for example approximately 10 cm. For each increment in water level, the output signal voltage of each of the pressure sensors 102, 104 may be recorded and plotted against the calculated water pressure for the known water levels. For each of the two pressure sensors 102, 104, the slope of the output signal voltage with respect to applied water pressure graph may then be determined and used as calibration factors (typically units are in kPa/V). However, any suitable method of calibrating the two pressure sensors 102, 104 to determine calibration factors may be utilized.

The sensor module 108 receives signals output by the total stress pressure sensor 102 and the pore water pressure sensor 104, determines a difference between the two output signals, and determines a height of soil based on the determined difference. As described in more detail below, the determined height may be the height of soil above the pressure sensors 102, 104 or may be the height of soil above the structure to which the sensor assembly 106 is coupled to.

The output signals may be processed output signals that are received from the optional signal processing unit 110. The signal processing unit 110 may include, for example, amplifiers to amplify analog signals output by the sensors 102, 104, passive or active filters to filter out the electrical noise of the analog signals output by the sensors 102, 104, an analog-to-digital converter to convert analog signals output by the sensors 102, 104, to digital signals that are then transmitted to the sensor module 108, as well as any other suitable signal processing elements. In some embodiments, the signal processing unit 110 may include a differentiator that determines the difference between the output signals of the two pressure sensors 102, 104 such that the sensor module 108 receives the difference in the signals rather than the signals themselves.

The sensor module 108 may transmit the determined height of soil to an external device 120 via connection 122. The connection 122 may be a wired connection, such as a cable, or may be a wireless connection. The wireless connection may be any suitable type of wireless communication such as short range communication, (Bluetooth™ or Wi-Fi for example), or long range communication (cellular communication for example). The external device 120 may be any device such as a personal computer, handheld mobile device, a server, or any other electronic device that is enabled to communicate with the sensor module 108.

The sensor module 108 may be implemented as, for example, a memory containing instructions for execution by a processor that, when executed, cause the processor to implement the methods described below. The memory and the processor may be included as part of a microcontroller, for example. The sensor module 108 may also be implemented by additional hardware, or by a combination of instructions stored in a memory and additional hardware, to name a few examples. The sensor module may also include a memory for storing information for later retrieval or transmission, such as the height of the soil values that are determined over time.

The sensor assembly 106 may be housed within a housing, as described in more detail below. The housing may be a waterproof housing. In some examples, all or portions of the sensor module 108 and the optional signal processing unit 110 may be housed within the housing in addition to the sensor assembly 106. Further, as described in more detail below, the sensor assembly 106 may include additional sensors such as one or more of an acceleration sensor, a light sensor, and a flow sensor. As described in more detail below, these additional sensors may act as a fail stop in the event that one or both of the pressure sensors 102, 104 become non-functional, an early warning that the height of the soil is being reduced, or may be utilized for verification that the pressure sensors 102, 104 are operating as expected.

Figure 2:
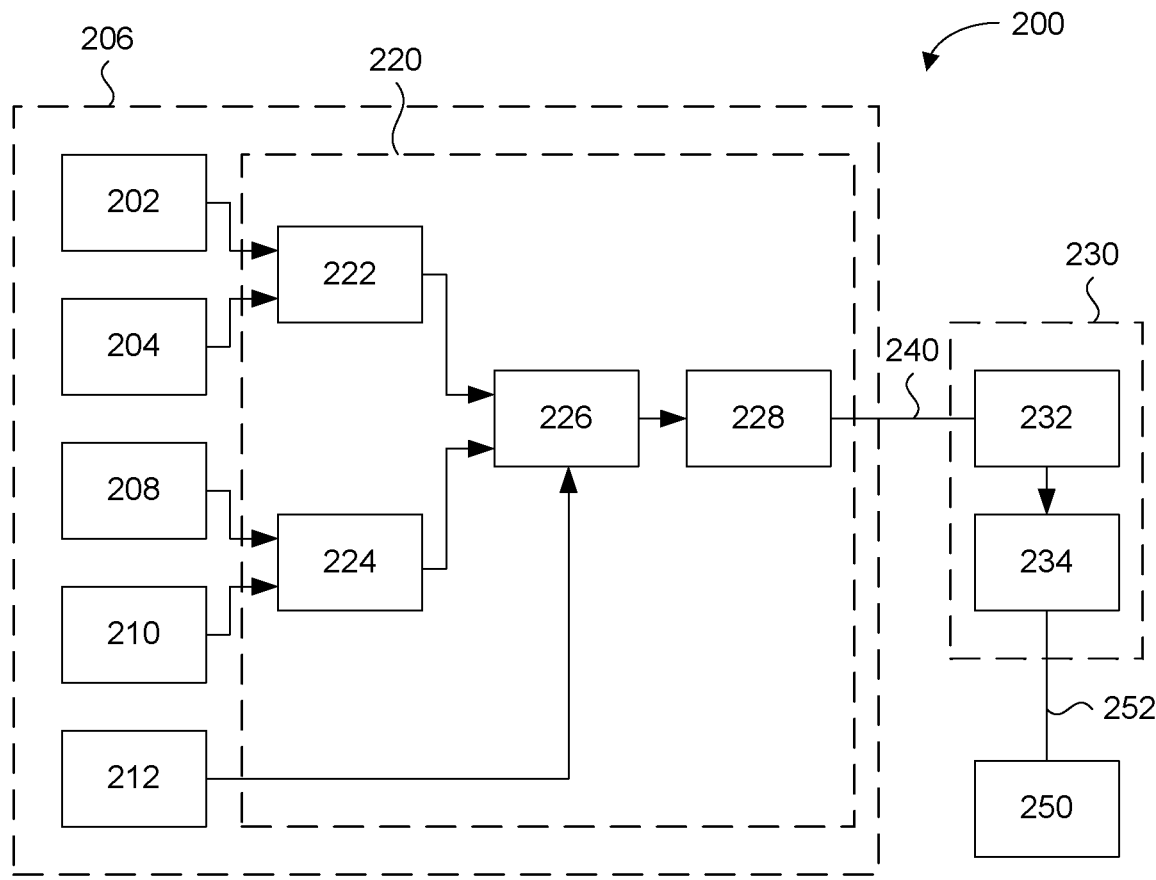
FIG. 2 is a schematic diagram of a device for monitoring the height of soil according to another embodiment.

For example, FIG. 2 shows a device 200 for determining a height of soil above a structure buried below the soil bed of a stream or other waterway that includes additional sensors. The example device 200 includes a sensor assembly 206 having a total stress pressure sensor 202 and a pore water pressure sensor 204, similar to the pressure sensors 102, 104 of the device 100 described above. The example sensor assembly 206 also includes a light sensor 208, a flow sensor 210, and an acceleration sensor 212 that, as described above, may be utilized for any or all of a fail-stop, an early warning, and to verify the operation of the pressure sensors 202, 204. The example sensor assembly 206 also includes an optional signal processing unit 220. The device 200 also includes a sensor module 230 for determining a height of the soil based on the output signals from the pressure sensors 202, 204.

The light sensor 208 generates an output signal that corresponds to the light level that the light sensor 208 is exposed to. The light level may indicate, for example, the amount of visible light present at the light sensor 208. When the light sensor 208 is buried beneath a soil bed, the output signal from the light sensor 208 indicates a low level due to absence of light, whereas when the light sensor 208 is exposed to light, due to the soil being removed by scour, the output signal from the light sensor 208 indicates a comparatively higher light level. The light sensor 208 may comprise any suitable light sensor such as any photocell that may be readily available and inexpensive. For example, a suitable light sensor may be an API CdS Photoconductive Photocell PDV-P8103, which is sensitive to visible light with wavelengths ranging from 400 to 700 nm. In an embodiment, the sensor module 230 may determine that the soil covering the light sensor 208 has been removed when the light level indicated by the output signal from the light sensor 208 meets or exceeds a threshold light level.

The flow sensor 210 generates an output signal that corresponds to a fluid flowing through the flow sensor 210. Flow sensor 210 generally includes a short pipe having a switch that is triggered when fluid flows through the pipe, or some other means for measuring flow of fluid through the short pipe. For example, the flow sensor 210 may include a turbine-type device such that flow of a fluid through the pipe causes a turbine rotation to occur, which in turn triggers a switch, or alternatively, generates an output signal that is proportional to the rate of flow of fluid. In another example, the flow sensor 210 may include a flap-type device such that flow through the pipe causes movement of the flap, which triggers a switch. It may be desirable for the flow sensor 210 to have a threshold flow velocity for triggering the switch that is sufficiently low in order to detect flow even in a slowly flowing stream. In the switch-type flow sensors described above, the output signal is typically "off", indicating that no flow is detected, or "on" indicating that flow is detected. In this case, the sensor module 230 may determine that the soil covering the flow sensor 210 has been removed when the output signal from the flow sensor 210 is "on". In other examples, the output of the flow sensor 210 may indicate a flow rate of fluid through the flow sensor 210. In this case, the sensor module 230 may determine that the soil covering the flow sensor 210 has been removed when the flow rate indicated by the output of the flow sensor 210 meets or exceeds a flow threshold.

Additionally, because the flow sensor 210 is buried under the soil when the device 200 is installed, it may be desirable to have a screen, such as a wire mesh screen, placed over the openings of the short pipe to inhibit soil sediments from entering the pipe and potentially preventing the switch of the flow sensor 210 from triggering while fluid is flowing through the short pipe.

The acceleration sensor 212 is an accelerometer that may be mounted within a small buoyant housing tethered to, for example, the outside of a housing of the device 200. When the device 200 is installed on a structure, and buried under a bed of soil of a waterway, the acceleration sensor 212 is held stationary due to the confinement of the soil. The acceleration sensor 212 is released from this confinement when scour exposes acceleration sensor 212. When released, the acceleration sensor 212 moves with the flow of water in the waterway, generating a fluctuating, or oscillatory, output signal from the sensor 212.

While it may be desirable, when the device 200 is installed on a structure, to have the pressure sensors 202, 204 installed as close to the structure as possible in order to accurately determine the height of soil overburden above the structure, the light sensor 208, the flow sensor 210, and the acceleration sensor 212 may be located at distances that are greater than the distance of the pressure sensors 202, 204 to the structure. Varying the distances from the structure to any of the other sensors 208, 210, 212 by way of configuration of the mounting locations of the sensors 208, 210, 212 in the device 200 housing, may be utilized as an early warning system that can indicate that height of soil is below a certain threshold height.

For example, if one of the other sensors 208, 210, 212 is located at a height 20 cm above the pressure sensors 202, 204, then the triggering of the sensors 208, 210, 212 gives a warning that the soil height above the pressure sensors 202, 204 is less than 20 cm. Furthermore, positioning the sensors 208, 210, 212 at distances away from the pressure sensors 202, 204, may be utilized to verify the operation of the pressure sensors 202, 204. For example, continuing the above example, triggering of the sensors 208, 210, 212 may be utilized to confirm whether or not the height of soil that is determined based on measurements of the pressure sensors 202, 204 taken at the time of the triggering is accurate. Continuing the above example, if the height determined based on the pressure sensors 202, 204 is 20 cm, then the pressure sensors 202, 204 may be confirmed as operating according to expectation. Conversely, if the height determined based on the output signals of the pressure sensors 202, 204 is not 20 cm, then the pressure sensors 202, 204 may be determined not to be operating as expected and therefore not reliable.

In addition, multiple additional sensors of 208, 210, 212 may be installed, each at a different distance from the structure, in order to provide multiple warnings, as well as multiple opportunities to confirm the operation of the pressure sensors 202, 204.

Additionally, or alternatively, any of the additional sensors 208, 210, 212 may be installed at approximately the same height above the structure as the pressure sensors 202, 204 in order to provide a fail stop. In this embodiment, in the event that the pressure sensors 202, 204 become non-operational, the triggering of the sensors 208, 210, 212 provides a backup indication that the structure has become exposed due to scour.

The device 200 may include any combination of the additional sensors 208, 210, 212. Further, the device 200 may include more than one of any one of the additional sensors 208, 210, 212 in order to provide redundancy, or to provide multiple warnings when installed at various distances from the buried structure or pipeline. In addition, multiple sets of pressure sensors 202, 204 may also be included within the sensor assembly 206.

The example signal processing unit 220 shown in FIG. 2 includes an amplifier 222 that amplifies the output signal from the pressure sensors 202, 204, and a voltage divider 224 through which the output signals from the light sensor 208 and the flow sensor 210 pass. The output signals from the pressure sensors 202, 204 after amplification by amplifier 222, the light sensor 208 and the flow sensor 210, after passing through the voltage divider 224, and the acceleration sensor 212 are input into an analog-to-digital converter 226 that converts the analog signals from the sensors into a digital signal that provides input to the sensor module 230.

Additional signal processing elements, in addition to or in place of, the amplifier 222, the voltage divider 224, and the analog-to-digital converter 226 may be included in the example signal processing unit 220. In addition, the elements of the signal processing unit 220 may be configured differently than shown in FIG. 2. Further, although FIG. 2 shows the elements of the signal processing unit 220 as separate elements, the functionality of two or more of the elements may be performed by a single hardware element, or the functionality of a single element may be performed by multiple separate hardware elements, or the functionality of any of the signal processing elements may be performed by the sensors themselves.

In the example device 200 shown in FIG. 2, the sensor assembly 206 is intended to be installed on a pipeline or other structure buried beneath the soil bed of a waterway, whereas the sensor module 230 may be located remotely such as, for example, on the shore of the waterway, or at some other location. Therefore, in order to pass the signals from the signal processing unit 220 to the sensor module 230, the signal processing unit 220 includes digital communication driver circuits 228 that are connected via a connection 240 to digital communication driver circuits 232 of the sensor module 230. The connection 240 may be any suitable wired connection, such as for example a cable, or wireless connection that facilitates communication from the sensor assembly 206 that is buried under a waterway to the sensor module 230 that is located on the shore of the waterway. This installation configuration of the sensor assembly 206 on the buried structure and a remote sensor module 230 is described in more detail below with reference to FIG. 3.

The example sensor module 230 shown in FIG. 2 also includes a microcontroller 234 that utilizes the signals received from the signal processing unit 220 and, based on the signals, determine a height of the soil above the pipeline or buried structure, as described in more detail below. The microcontroller 234 may comprise a processor and a memory containing instructions for execution by the processor that, when executed, cause the processor to utilize the signals from the sensor assembly 206 to determine the height of the soil above the structure. The microcontroller may also utilize the signals from the other sensors 208, 210, 212 to verify the operation of the pressure sensors 202, 204, or provide an early warning signal, as described above. As described above with reference to the sensor module 108, the sensor module 230 may similarly include any suitable combination of hardware and software in place of the microcontroller 234.

The sensor module 230, or the sensor assembly 206, or both may include a power supply (not shown) that powers the various components of the device 200. The power supply may be, for example, one or more batteries. Power may be provided from a power supply in the sensor module 230 to the sensor assembly 206, or from a power supply in the sensor assembly 206 to the sensor module 230, with power being transferred between the sensor module 230 and the sensor assembly 206 via the connection 240.

Similar to sensor module 108 described above with reference to FIG. 1, the sensor module 230 shown in FIG. 2 may be connectable to an external device 250 via connection 252. As described above, the connection 252 may be any suitable wired or wireless connection. The external device 250 may be any device such as, a personal computer, handheld mobile device, or any other electronic device that is enabled to communicate with the sensor module 230.

Figure 3:
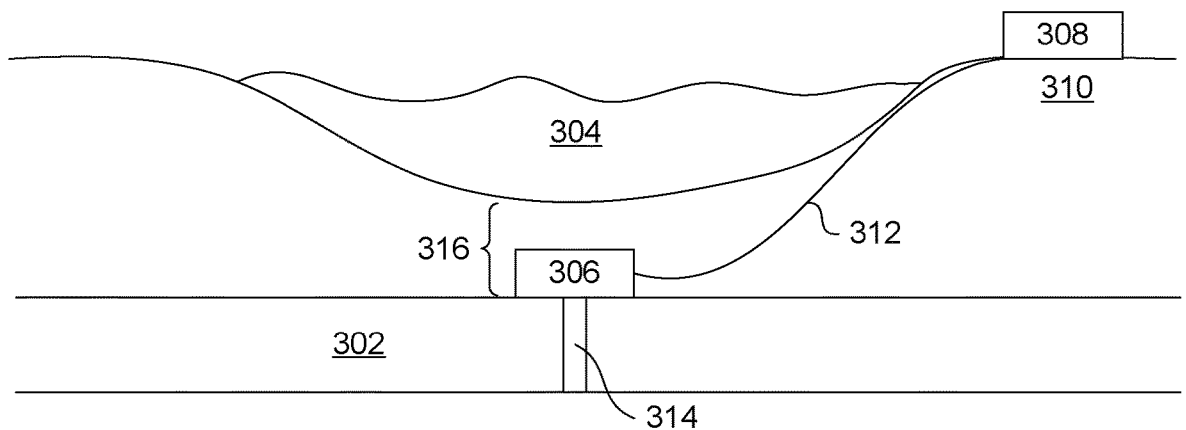
FIG. 3 is a schematic diagram of a device for monitoring the height of soil installed on a pipeline at a waterway crossing.

FIG. 3 shows an example of a device for determining a height of soil, such as either of the devices 100 or 200 described above with reference to FIGS. 1 and 2, that is installed onto a section of a pipeline 302 that passes under a waterway 304. In the example shown, the device includes a sensor assembly 306 that is coupled to the pipeline 302, where the sensor assembly 306 may be similar to either of the sensor assemblies 106 or 206 described previously. The device also includes a sensor module 308 that is located on the shore 310 of the waterway. The sensor module 308 may be similar to either of the sensor modules 108 or 230 described previously. The sensor assembly 306 is connected to the sensor module 308 by a connection 312, which may be similar to connection 122 or 240 described above. Alternatively, both of the sensor assembly 306 and the sensor module 308 may be coupled to the pipeline 302. Together, the sensor assembly 306 and the sensor module 308 may be utilized to determine the height 316 of the soil overlying the pipeline 302.

The sensor module 306 is coupled to the pipeline 302 by coupler 314. The coupler 314 may be, for example, a strap or any other suitable method of coupling the sensor assembly 306 to the pipeline 302. Depending on the materials utilized for the housing of the sensor assembly 306 and the coupler 314, insulation may be provided between the pipeline 302 and either or both of the sensor assembly 306 and the coupler 314 to inhibit an induced voltage potential from forming that may contribute to corrosion of the pipeline 302. In general, the coupler 314 should be chosen in line with relevant industrial requirements as well as chemical and electrical considerations having regard to the material of the pipeline 302, any corrosion inhibiting devices, as well as any coatings that may be on the surface of the pipeline 302.

As discussed above, all or parts of the components of the example devices 100 and 200 may be included within a housing that is installed on a structure buried under a soil bed of a waterway. The housing may be waterproof in order to inhibit water ingress into the housing, which may damage the components housed within.

Figure 4A:
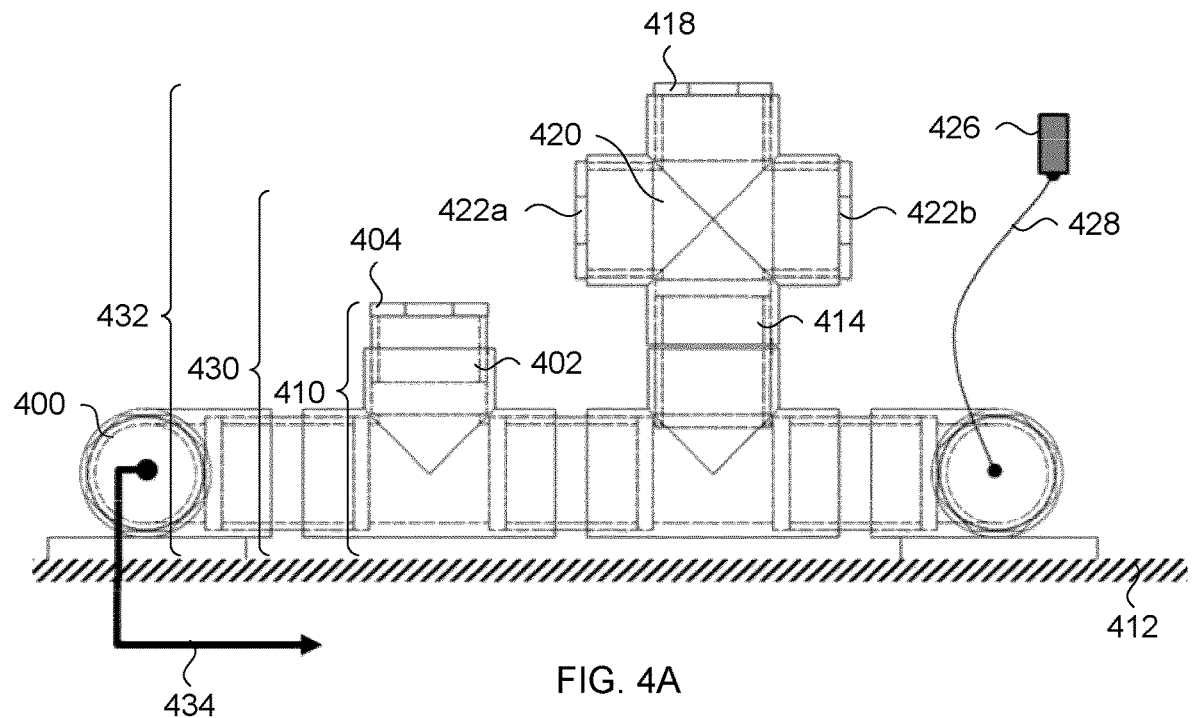
FIG. 4A is side plane view of a housing of a device for determining the height of soil according to an embodiment.
Figure 4B:
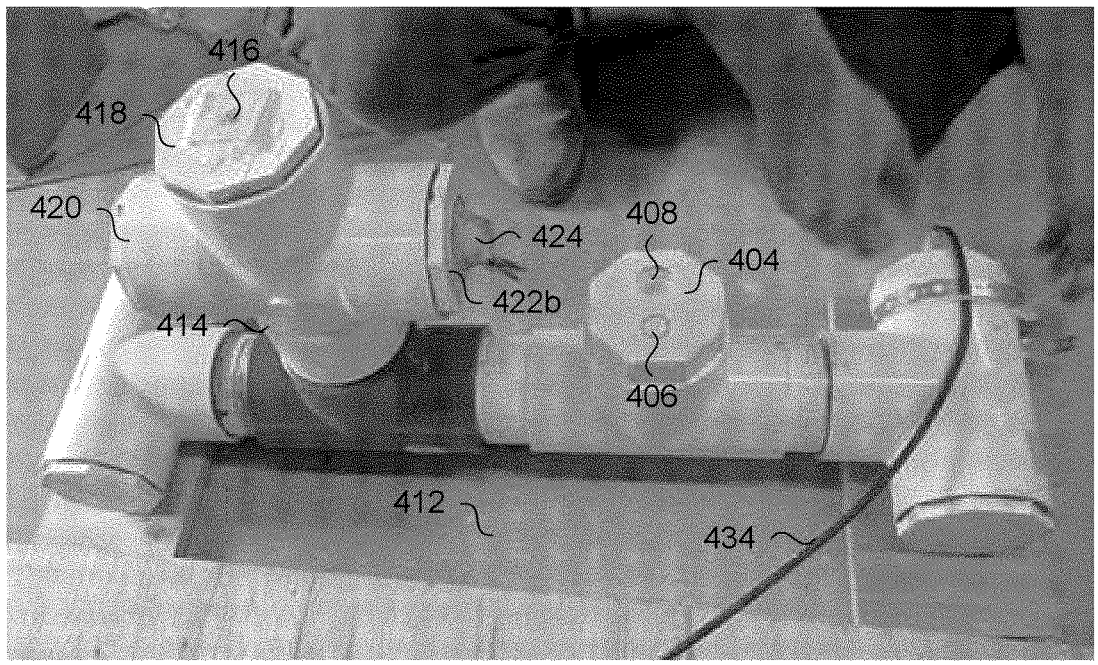
FIG. 4B is a photograph showing a perspective view of the housing of a device for determining the height of soil according to the embodiment shown in FIG. 4A.

Referring now to FIGS. 4A and 4B, there is shown a housing 400 that may be utilized to house various components of a device such as devices 100 and 200 described above. The housing 400 is waterproof and may be formed of sections of PVC pipe that are coupled together, or any other suitable material may be utilized for the housing 400. The housing includes a first section 402 having a top surface 404 (shown in FIG. 4B also) through which a total stress pressure sensor 406 and a pore water pressure sensor 408 are fitted in close proximity. The pressure sensors 406 and 408 are located at a distance 410 above the surface 412 on which the housing 400 is installed. The distance 410 of the pressure sensors 406, 408 above the surface 412 may be utilized to determine the height of soil above the surface 412 based on the output signals of the pressure sensor 406, 408. For example, the distance 410 may be added to the height of soil that is determined based on the pressures measured by the pressure sensors 406, 408 to determine the actual soil cover above the surface 412, which may be for example the crown of a pipe onto which the housing 400 is coupled.

The example housing 400 includes a second section 414 that houses a light sensor 416 and a flow sensor (not shown). The second section 414 includes a top surface 418 through which the light sensor 416 is fitted. The second section also includes a horizontal section 420 in which the flow sensor is fitted. The horizontal section 420 includes openings 422a, 422b in opposing ends that correspond to the ends of the short pipe of the flow sensor such that fluid may flow through the flow sensor. The openings 422a, 422b may each include a screen 424 (shown in FIG. 4B) to inhibit soil sediment from entering and clogging the flow sensor, as described previously.

An acceleration sensor 426 is coupled to the housing 400 by tether 428 (shown in FIG. 4A). The tether may also include a connector such as, for example, a wire, to carry the output signal generated by the acceleration sensor 426 to a sensor module (not shown).

In the example housing 400, the openings of the flow sensor 422a, 422b are spaced vertically from the surface 412 by a distance 430 that is greater than the distance 410 of the pressure sensors 406, 408. Further, in the example housing 400 the light sensor 416 is spaced vertically from the surface 412 by a distance 432 that is greater than the distance 410 of the pressure sensors 406, 408 and greater than the distance 430 of the flow sensor. The tether 428 may be provided with a length that enables the acceleration sensor 426 to be buried in soil at a desired distance from the surface 412 when the device is installed. The distances 430, 432 between the surface 412 and each of the flow sensor and the light sensor 416, respectively, as well as a length of the tether 428 of the acceleration sensor 426 may be selected to be different than the distance 410 of the pressure sensors 406, 408 to provide warnings, or verification of the operation of the pressure sensors 406, 408, or both, as described previously.

The device shown in FIGS. 4A and 4B includes a cable 434 that may connect a sensor assembly housed within the housing 400 to a remotely located sensor module, similar to the above description with reference to FIGS. 2 and 3, or may connect a sensor module housed within the housing 400 with an external device.

Figure 5:
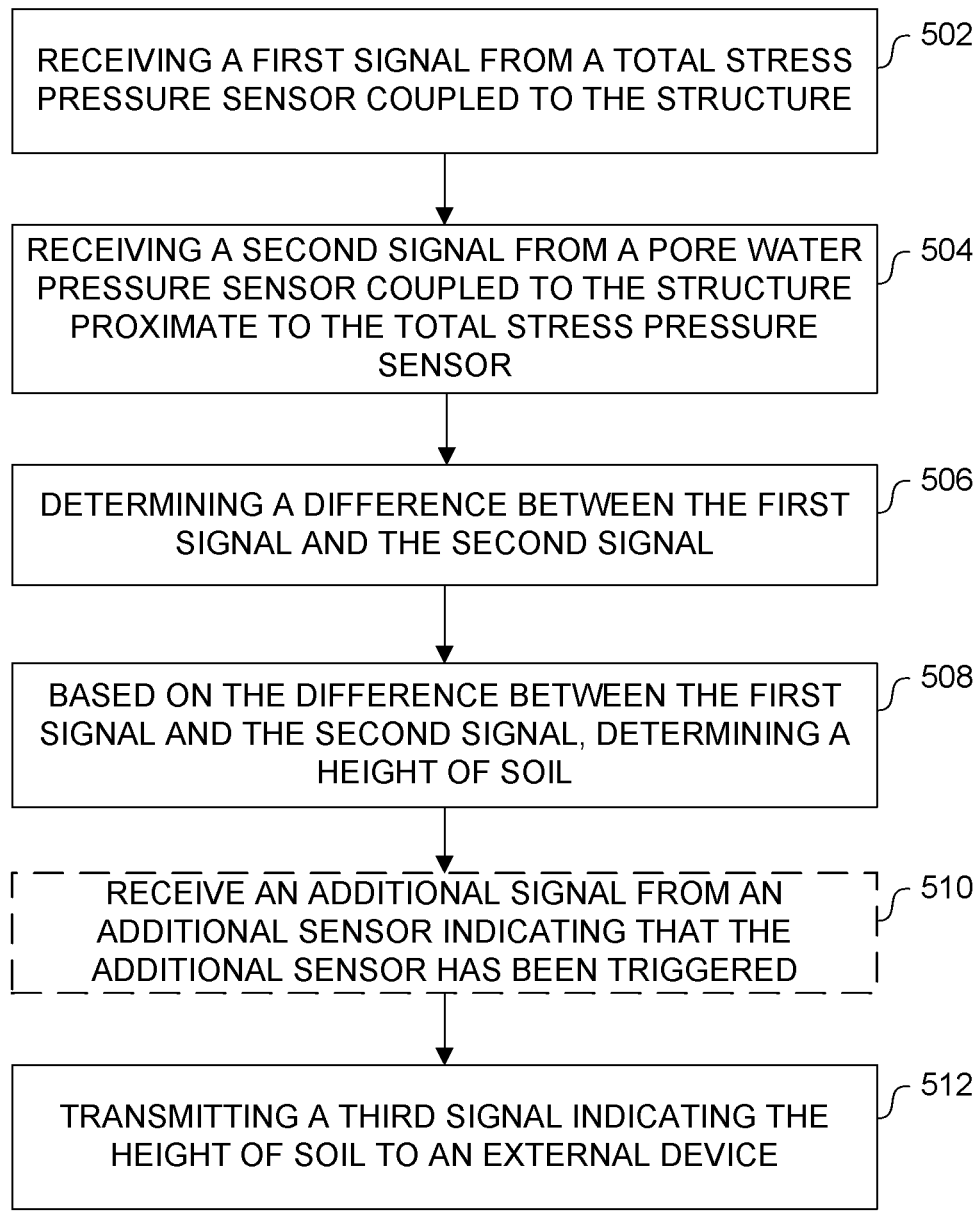
FIG. 5 is a flow chart illustrating a method for determining the height of soil above a structure buried below the soil bed of a waterway according to an embodiment.

Referring now to FIG. 5, a flow chart illustrating a method for determining the height of soil above a structure buried below the soil bed of a waterway is shown. The method may be implemented by, for example, the devices 100 and 200 described previously. The steps of the method may be performed by a processor executing computer readable code, such as a processor included within the example sensor modules 108 and 230 described previously.

A first signal from a total stress pressure sensor coupled to the structure is received at 502. The first signal indicates a total pressure on the total stress pressure sensor due to the soil and water overlying the total pressure sensor. The first signal may be received directly from the total stress pressure sensor, or may be received from an optional signal processing unit after processing the signal output from the total stress pressure sensor, as described above.

A second signal from a pore water pressure sensor that is coupled to the structure proximate the total stress pressure sensor is received at 504. The second signal indicates a pressure on the pore water pressure sensor due to only the water above the pore water pressure sensor. The second signal may be received directly from the pore water pressure sensor, or may be received from an optional signal processing unit after processing the signal output from the pore water pressure sensor, as described above.

A difference between the first signal and the second signal is determined at 506. Because the first signal indicates the total pressure due to both water and soil, and the second signal indicates pressure due to water only, the difference between the first signal and the second signal indicates an effective soil pressure, or stress, that is due to the soil only. The difference determined at 506 may be determined based on a calibration factor utilized to calibrate the total stress pressure sensor and the pore water pressure sensor, as described above.

At 508, a height of the soil is determined based on the difference between the first signal and the second signal. Determining the height of the soil above the structure may comprise determining a prismoidal column of submerged soil that results in the pressure given by the difference in first and second pressure signals. As described below, determining a height of soil at 508 may comprise determining the height of soil above the two pressure sensors, or may comprise determining the height of soil above the structure on which the two pressure sensors are installed.

Determining the height of soil above the two pressure sensors may include dividing the effective soil stress, given by the difference determined at 506, by a submerged unit weight of the soil to estimate the height of the soil above the two sensors at the time of pressure measurements received at 502 and 504. The effective soil stress may be expressed in $kN/m^2$ or kPa and the submerged unit weight of the soil may be expressed in $kN/m^3$, which results in an estimated soil height in meters.

The submerged unit weight of the soil may be determined by subtracting the unit weight of water from the total saturated unit weight of the soil. The total saturated unit weight of the soil depends on the soil type. For most riverbed conditions, which typically comprise gravity deposited soil, a value of 18 $kN/m^3$ is a reasonable approximation for the saturated unit weight of the soil, and the unit weight of water can be assumed to be 9.8 $kN/m^3$, which gives a submerged unit weight of 8.2 $kN/m^3$.

However, if more accurate determinations are desired, the actual saturated unit weight of the particular soil overlying the structure could be utilized for the determination of the height of soil over the two pressure sensors.

If the height of soil determined at 508 is the height of soil above the structure to which the two pressure sensors are coupled, the determining may include adding the distance between the structure and the two pressure sensors to the height of the soil above the two pressure sensors determined based on the first and second signals.

If optional additional sensors are included in the device, for example, any of a light sensor, a flow sensor, and an acceleration sensor as described above, then additional signals from the additional sensors may optionally be received at 510. The additional signals may indicate that an additional sensor has been triggered. As described above, the additional signals from the optional additional sensors may be utilized as a fail stop in the event that the pressure sensors fail, to verify the operation of the pressure sensors by comparing the triggering of an additional sensor at a known distance from the structure with the height of soil determined at 508, or to provide a warning that the height of soil has been reduced to below a certain level.

The additional signal may indicate that the additional sensor has been triggered if the signal meets or exceeds a threshold. For example, if the additional sensor is a light sensor having an output signal indicating a detected light level, then the additional signal may indicate that the light sensor is triggered when the detected light level meets or exceeds a light threshold. Similarly, if the additional sensor is an acceleration sensor for which the output signal indicates movement of the acceleration sensor, then the additional signal may indicate that the acceleration sensor is triggered when the movement meets or exceeds a movement threshold. If the additional sensor is a flow sensor for which the output signal indicates a flow rate of fluid through the flow sensor, then the additional signal may indicate that the flow sensor is triggered when the flow rate meets or exceeds a threshold. Alternatively, if the flow sensor is a type that includes a switch that is triggered by a threshold flow rate flowing through the flow sensor, as described above, then merely receiving the additional signal from the flow sensor indicates that the flow sensor has been triggered.

At 512, a third signal indicating the determined height of the soil above the sensor assembly, or above the structure, is transmitted to an external device. As described above, the external device may be a personal computer, a mobile communication device, or a server that is in communication with the device by any wired or wireless connection. The third signal may also include information associated with the triggering of any optional additional sensors, for example, a warning that the soil height has been reduced to the level of the additional sensor, or indicating that the pressure sensors are not operating as expected.

Receiving the first and second signals at 502 and 504, determining the soil height at 508, and transmitting the third signal at 512 may be performed periodically such that the height of soil is monitored by the external device over time. Additionally, or alternatively, any or all of the receiving at 502 and 504, the determining at 508 and the transmitting at 512 may be performed on demand. For example, the transmitting at 512 may be performed in response to a user connecting an external device to the sensor module on site and downloading determined height of soil information that is stored on the sensor module. Additionally, or alternatively, the transmission at 512 may occur in response to receiving an additional signal that an additional sensor has been triggered to provide a warning to the external device that the height of soil is being reduced or that the pressure sensors are not operating as expected.

Embodiments of the present disclosure provide a device for determining, and monitoring, the height of soil above a structure buried beneath a soil bed of a waterway, such as a pipeline at a river crossing. The embodiments of the present disclosure may include readily available, off the shelf components such that the devices of the present disclosure may be less complex and less expensive to manufacture than prior art devices. Some embodiments of the present disclosure include optional additional sensors that provide redundancy for and verification of the pressure sensors of the device. Further, the additional sensors may be located at a greater height above the structure to provide a warning, or a series of warnings, that the height of the soil is being reduced.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A device for determining a height of soil above a structure buried below a soil bed of a waterway, the device comprising: a sensor assembly comprising:
   a total stress pressure sensor for transmitting a first signal indicating a total pressure on the total stress pressure sensor due to soil and water;
   a pore water pressure sensor located proximate to the total stress pressure sensor, the pore water pressure sensor for transmitting a second signal indicating a fluid pressure on the pore water pressure sensor due to water;
   wherein the total stress pressure sensor and the pore water pressure sensor are located on the device such that, when the device is coupled to a structure during operation, the total stress pressure sensor and the pore water pressure sensor are at approximately a same height relative to the structure;
   a sensor module in communication with the total stress pressure sensor and the pore water pressure sensor, the sensor module configured to:
   receive the first and the second signals;
   determine a difference between the first signal indicating the total pressure due to soil and water and the second signal indicating the fluid pressure due to water;
   based on the difference between the first signal and the second signal, determine a height of soil above the sensor assembly; and
   transmit a third signal indicating the height of soil to an external device.

2. The device of claim 1, wherein the sensor assembly further comprising an accelerometer coupled to a housing of the device by a tether, the accelerometer for transmitting a fourth signal indicating movement of the accelerometer;
   wherein the sensor module is in communication with the accelerometer and is further configured to:
   receive the fourth signal;
   based on the fourth signal, determine that the accelerometer is moving;
   transmit a fifth signal indicating that the accelerometer is moving.

3. The device of claim 2, wherein the sensor module determines that the accelerometer is moving by determining, based on the fourth signal, that the movement exceeds a movement threshold.

4. The device of claim 1, wherein the sensor assembly further comprises a light sensor, the light sensor for transmitting a sixth signal indicating a lighting level;
   wherein the sensor module is in communication with the light sensor and is further configured to:
   receive the sixth signal from the light sensor;
   based on the sixth signal, determine that lighting level exceeds a lighting threshold; and
   transmit a seventh signal indicating that the lighting level exceeds the lighting threshold.

5. The device of claim 1, wherein the sensor assembly further comprises a flow sensor, the flow sensor for transmitting an eighth signal indicating a flow of fluid through the flow sensor; and
   wherein the sensor module is in communication with the flow sensor and is further configured to:
   receive the eighth signal from the flow sensor;
   based on the eighth signal, determine that a fluid is flowing through the flow sensor; and
   transmit a ninth signal indicating that fluid is flowing through the flow sensor.

6. The device of claim 5, wherein the sensor module determines that fluid is flowing through the flow sensor by determining, based on the eighth signal, that the flow of fluid through the flow sensor exceeds a flow threshold.

7. The device of claim 1, wherein the pore water pressure sensor includes a saturated porous stone.

8. The device of claim 7, wherein the saturated porous stone is saturated by one of boiling the porous stone in water and saturating the porous stone with glycerin.

9. The device of claim 1, wherein determining the height of the soil based on the difference between the first signal and the second signal comprises determining the height of the soil based on a calibration factor.

10. The device of claim 1, wherein the sensor assembly is housed within a waterproof housing.

11. The device of claim 1, wherein the sensor module is configured to transmit signals to the external device via a wireless transmitter or via a wired connection.

12. A method for determining a height of soil above a structure buried below a soil bed of a waterway, the method comprising:
- receiving a first signal from a total stress pressure sensor coupled to the structure, the first signal indicating a total pressure measured by the total stress pressure sensor due to soil and water;
- receiving a second signal from a pore water pressure sensor coupled to the structure proximate to the total stress pressure sensor, the second signal indicating a fluid pressure on the pore water pressure sensor due to water;
- wherein the total stress pressure sensor and the pore water pressure sensor are located at approximately a same height relative to the structure;
- determining a difference between the first signal indicating the total pressure due to soil and water and the second signal indicating the fluid pressure due to water;
- based on the difference between the first signal and the second signal, determining a height of soil above the total stress pressure sensor and the pore water pressure sensor; and
- transmitting a third signal indicating the determined height of soil to an external device.

13. The method of claim 12, further comprising:
- receiving a fourth signal from an accelerometer coupled to the structure by a tether, the fourth signal indicating movement of the accelerometer; and
- based on the fourth signal, determining that the accelerometer is moving;
- transmitting a fifth signal indicating that the accelerometer is moving.

14. The method of claim 13, wherein determining that the accelerometer is moving comprises determining, based on the fourth signal, that the movement of the accelerometer exceeds a movement threshold.

15. The method of claim 12, further comprising:
- receiving a sixth signal from a light sensor coupled to the structure, the sixth signal indicating a lighting level;
- based on the sixth signal, determining that the lighting level exceeds a lighting threshold; and
- transmitting a seventh signal indicating that the lighting level exceeds the lighting threshold.

16. The method of claim 12, further comprising:
- receiving an eighth signal from a flow sensor coupled to the structure, the eighth signal indicating a flow of fluid through the flow sensor; and
- based on the eighth signal, determining that a fluid is flowing through the flow sensor; and
- transmitting a ninth signal indicating that fluid is flowing through the flow sensor.

17. The method of claim 16, wherein determining that fluid is flowing through the flow sensor comprises determining, based on the eighth signal, that the flow of fluid through the flow sensor exceeds a flow threshold.

18. The method of claim 12, further comprising saturating a porous stone of the pore water pressure sensor by one of boiling the porous stone in water and saturating the porous stone with glycerin prior to coupling the pore water pressure sensor to the structure.

19. The method of claim 12, wherein determining the height of the soil based on the difference between the first signal and the second signal comprises determining the height of the soil based on a calibration factor.

20. The method of claim 12, wherein transmitting the third signal to the external device comprises one of transmitting wirelessly via a wireless transmitter or transmitting via a wired connection.

* * * * *